United States Patent
Drexler et al.

(10) Patent No.: US 8,185,680 B2
(45) Date of Patent: May 22, 2012

(54) METHOD FOR CHANGING OWNERSHIP OF A BUS BETWEEN MASTER/SLAVE DEVICES

(75) Inventors: Barry L. Drexler, Oakdale, NY (US); Steven J. Sipek, Holbrook, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 479 days.

(21) Appl. No.: 11/348,219

(22) Filed: Feb. 6, 2006

(65) Prior Publication Data

US 2007/0186020 A1    Aug. 9, 2007

(51) Int. Cl.
*G06F 13/368* (2006.01)
*G06F 13/372* (2006.01)
*G06F 12/00* (2006.01)
*G06F 13/00* (2006.01)

(52) U.S. Cl. ........ 710/119; 710/126; 710/240; 710/129; 710/131; 710/304; 711/115

(58) Field of Classification Search ................. 710/119, 710/240, 126, 129, 131, 305; 711/115
See application file for complete search history.

(56) References Cited

U.S. PATENT DOCUMENTS

| | | | | |
|---|---|---|---|---|
| 4,807,109 | A * | 2/1989 | Farrell et al. ................. | 713/401 |
| 5,473,762 | A * | 12/1995 | Krein et al. .................. | 710/107 |
| 5,491,787 | A * | 2/1996 | Hashemi ........................ | 714/11 |
| 5,495,240 | A * | 2/1996 | Heberle .................... | 340/870.13 |
| 5,699,516 | A * | 12/1997 | Sapir et al. .................... | 710/110 |
| 5,754,799 | A * | 5/1998 | Hiles ............................ | 710/110 |
| 5,761,451 | A * | 6/1998 | Abert et al. ................... | 710/113 |
| 5,809,518 | A * | 9/1998 | Lee .............................. | 711/115 |
| 5,943,483 | A * | 8/1999 | Solomon ........................ | 710/107 |
| 6,055,372 | A * | 4/2000 | Kardach et al. ............... | 710/261 |
| 6,141,765 | A * | 10/2000 | Sherman ........................ | 713/400 |
| 6,233,635 | B1 * | 5/2001 | Son .............................. | 710/315 |
| 6,327,670 | B1 * | 12/2001 | Hellenthal et al. ............... | 714/5 |
| 6,363,464 | B1 * | 3/2002 | Mangione ..................... | 711/167 |
| 6,463,072 | B1 * | 10/2002 | Wolrich et al. ............... | 370/439 |
| 6,463,494 | B1 * | 10/2002 | Morriss et al. ............... | 710/305 |

(Continued)

OTHER PUBLICATIONS

The I2C Bus Specification, Philips, Jan. 2000, version 2.1.*

*Primary Examiner* — Paul R Myers
*Assistant Examiner* — Christopher A Daley
(74) *Attorney, Agent, or Firm* — Meyertons Hood Kivlin Kowert & Goetzel, P.C.; Jeffrey C. Hood

(57) ABSTRACT

A system may comprise multiple master/slave devices coupled to a common bus, where one of the devices may operate as the current master device and the other devices may operate as current slave devices. Current slave devices may embed bus ownership request information within response packets transmitted in response to standard bus operations, such as reads and writes, issued by the current master device. When the current master device is idle, its bus interface may continually poll the current slave devices at regular intervals, according to a specified protocol, to ascertain whether any of them are requesting bus ownership. A response to a request for bus ownership received by the current master device may be configured according to desired system functionality. In one system, ownership may always be transferred to the requesting device. In other systems, the current master device may transmit a subsequent standard bus operation request packet, or a unique response packet, either comprising embedded information indicating whether ownership of the bus has been granted.

32 Claims, 5 Drawing Sheets

U.S. PATENT DOCUMENTS

| | | |
|---|---|---|
| 6,591,294 B2 | 7/2003 | Kawasaki et al. |
| 6,598,107 B1 * | 7/2003 | von der Wense et al. ..... 710/305 |
| 6,681,279 B1 * | 1/2004 | Peng ............................ 710/240 |
| 6,697,897 B1 * | 2/2004 | Friel et al. .................... 710/105 |
| 6,704,819 B1 * | 3/2004 | Chrysanthakopoulos .... 710/240 |
| 6,708,246 B1 * | 3/2004 | Ishihara et al. ............... 710/309 |
| 6,735,653 B2 * | 5/2004 | O Mathuna et al. .......... 710/105 |
| 6,807,593 B1 * | 10/2004 | Moss et al. .................... 710/110 |
| 6,904,481 B1 * | 6/2005 | Besmer et al. ................ 710/107 |
| 6,952,618 B2 | 10/2005 | Davlin et al. |
| 6,952,789 B1 | 10/2005 | Azim et al. |
| 6,961,793 B2 * | 11/2005 | Kato ............................. 710/113 |
| 7,039,734 B2 * | 5/2006 | Sun et al. ...................... 710/110 |
| 7,058,742 B2 * | 6/2006 | Kim ............................... 710/116 |
| 7,107,365 B1 * | 9/2006 | Clark .............................. 710/35 |
| 7,111,097 B2 * | 9/2006 | Lin ................................ 710/105 |
| 7,143,215 B2 * | 11/2006 | Dunstan et al. ............... 710/104 |
| 7,181,557 B1 * | 2/2007 | Falik et al. .................... 710/110 |
| 7,225,281 B2 * | 5/2007 | Rosenbluth et al. .......... 710/104 |
| 7,284,078 B2 * | 10/2007 | Fleury ........................... 710/107 |
| 7,395,362 B2 * | 7/2008 | Drexler et al. ................ 710/260 |
| 2002/0120795 A1 * | 8/2002 | Charlier ......................... 710/33 |
| 2004/0233917 A1 * | 11/2004 | Rocas et al. ............. 370/395.62 |
| 2005/0114742 A1 * | 5/2005 | Takenobu ....................... 714/56 |

* cited by examiner

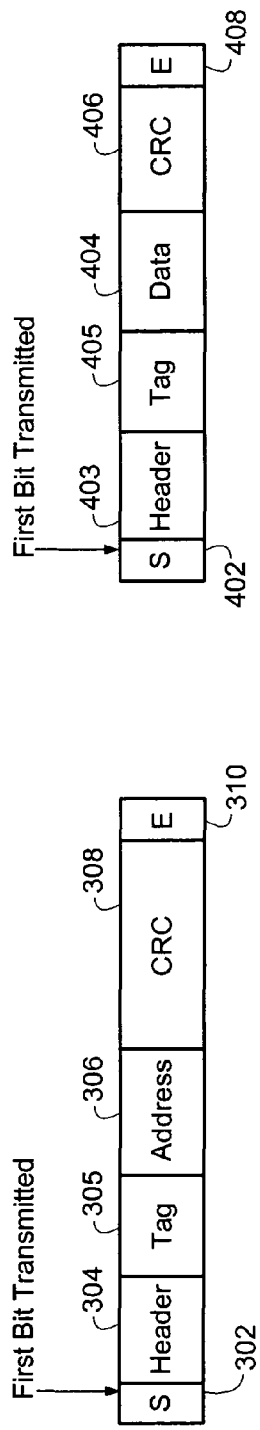
FIG. 3
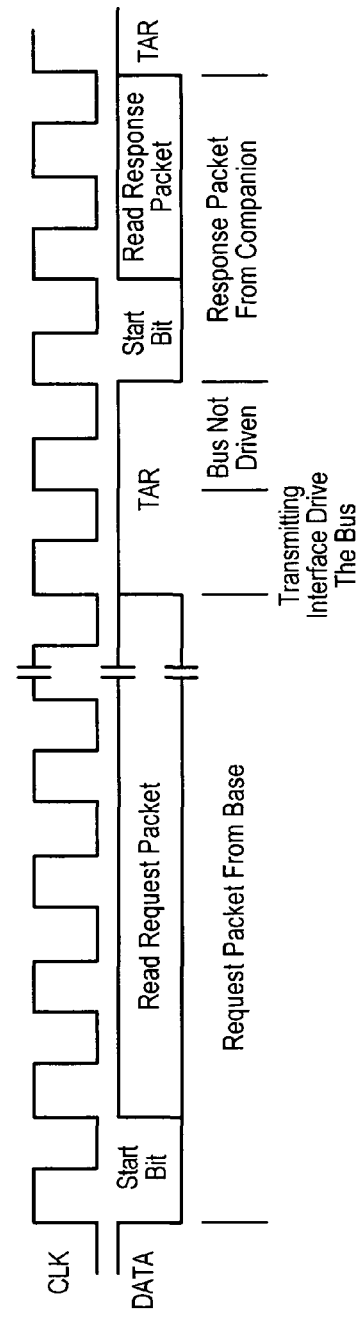
FIG. 4
FIG. 5

METHOD FOR CHANGING OWNERSHIP OF A BUS BETWEEN MASTER/SLAVE DEVICES

BACKGROUND OF THE INVENTION

1. Field of the Invention

This invention relates to digital interface design, and more particularly, to bus interface design.

2. Description of the Related Art

In many computer systems, master/slave is a widely used communication protocol, according to which two or more devices or processes are typically configured such that one of the devices or processes, designated as a master device or process, has unidirectional control over the other devices. Once a master/slave relationship has been established between select devices and/or processes configured in a system, the direction of control will be from the master device to the slave device, or from the master device to multiple slave devices. Accordingly, in master/slave systems the master device, or host device, typically determines which of the interconnected devices can initiate bus operations. Systems in which all interconnected devices have equal responsibility for initiating, maintaining, and terminating a bus operation are sometimes characterized as peer-to-peer systems. If a master device in a system were configured to allow all other devices to also initiate any and/or all bus transactions, that system would appear as a peer-to-peer system to a user. Such systems may also be referred to as multi-master/slave systems, in which each interconnected device may operate as either a master device or a slave device.

In a multi-master/slave system, typically only one of the master/slave devices can have ownership of a common bus at any one time. Generally, communication between master/slave devices has to be configured in a manner that facilitates the switching of bus ownership between the devices. Multi-master/slave systems may therefore typically operate according to certain designated protocols, with a variety of possible mechanisms built in for each device to request ownership, or control of the bus. Oftentimes, these mechanisms may require processing overhead for each device, or additional connections between each of the devices. However, many multi-master/slave systems may need to limit interconnect wires due to device size or number of I/O pins available on each device. Similarly, many of the same systems may not be able to afford the processing overhead that may be required for establishing communications between the devices that would facilitate seamless bus ownership transfer between the devices.

Many other problems and disadvantages of the prior art will become apparent to one skilled in the art after comparing such prior art with the present invention as described herein.

SUMMARY OF THE INVENTION

In one set of embodiments, a computer system may comprise multiple master/slave devices coupled to a common bus, where each master/slave device may be configured with the ability to transfer bus ownership to any of the other master/slave devices without additional dedicated lines or without requiring processing overhead from any of the devices. Information indicating a bus ownership request may be transmitted by any device currently operating as a slave device, during a typical response to any operation—such as a read or a write—that was issued by the device currently operating as the master device. Thus, each master/slave device may be configured to return data indicating a bus ownership request as part of a normal response to a bus operation request made by a master/slave device currently operating as the master device.

For cases when a device operating as the current master device may not initiate any bus operation requests, the bus interface comprised in the device may be configured to operate following a special protocol, according to which the bus interface may poll the current slave devices at regular intervals to ascertain whether any of the current slave devices are requesting bus ownership. The current master device may be unaware of the polling activity, which may remain hidden, as the current master device may remain idle during the polling activity. The polling activity may comprise the bus interface issuing special inquiry commands to the current slave devices, to which the current slave devices may respond in a manner similar to responding to standard bus operation requests. However, in such instances the response may take place while the current master device is idle with respect to the bus. A device operating as the master device may thus receive ownership requests when it is idle with respect to the bus, without requiring any dedicated lines, or without having to configure any of the master/slave devices with the ability to make requests on the bus while operating as a slave device. Furthermore, a device operating as the master device may also receive ownership requests without having to poll other devices for ownership requests.

In one set of embodiments, when a device operating as the master device receives a response packet indicating a request for bus ownership, ownership of the bus may be transferred, or retained according to a variety of previously established rules based on any desired protocol. In one embodiment, in response to a bus ownership request, the bus may always be turned around. In another embodiment, the device currently operating as the master device may respond to the bus ownership request with another request for a standard bus operation, for example a read or a write, with information indicating whether the bus has been granted or not granted imbedded in the request for the standard bus operation. In yet another embodiment, the device currently operating as the master device may transmit a unique packet to the device requesting bus ownership, indicating whether the request for bus ownership is granted or denied.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which:

FIG. 3 shows one embodiment of a read request packet;

FIG. 4 shows one embodiment of a read response packet;

FIG. 5 shows timing for a read operation according to one embodiment;

Figure 1:
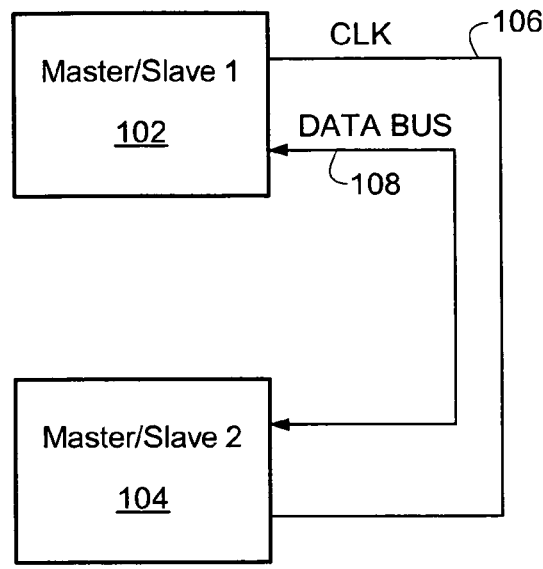
FIG. 1 shows one embodiment of a two-master/slave system configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. "Asserting" a signal refers to setting a level of the signal to a high logic level, whereas "deasserting" a signal refers to setting an output of the signal to a low logic level. It will be evident to those skilled in the art that a high logic level may be physically represented by either a high voltage or a low voltage, and similarly a low logic level may be physically represented by either a low voltage or a high voltage. When referencing numbers, a leading 'b' in front of a numeric sequence indicates that a binary number follows. For example, 'b10' may refer to a 2-bit binary number, the MSB (most significant bit) of which is '1'. A number preceding the letter 'b' and separated by an apostrophe indicates the number of bits in the binary number that follows. For example, "8'b0" may refer to an 8-bit binary number with all eight bits being '0'. Similarly, "8"b10xx_xxxx" may refer to a binary number whose upper two bits comprise '10', with each one of the remaining bits comprising either a '1' or a '0'.

FIG. 1 shows one embodiment of a two-master/slave system, in which either master/slave device 102 or master/slave device 104 may control the clock source and provide clock signal 106, and operate as the master device. The embodiment of FIG. 1 may be exemplary of a computer system, a computer subsystem interconnect, a control system, or a control subsystem interconnection. When master/slave device 102 has ownership of bidirectional bus 108, master/slave device 104 may not initiate any transactions. Data for regular bus transactions, such as bus reads and bus writes, may be transmitted via bidirectional bus 108. Alternate embodiments may not include clock line 106 and may instead be configured with a clock recovery circuit, well known to those skilled in the art. Master/slave device 102 may be a computer that is communicating with master/slave device 104, which may be a secondary system such as an Input/Output device or another computer or controller.

When having ownership of bus 108, master/slave device 102 may initiate bus operations such as reads and writes. Master/slave device 104 may respond to those requests by returning data requested by master/slave device 102 for a read operation or by acknowledging a write operation. In responding to those requests, master/slave device 104 may embed data corresponding to a bus ownership request into the response, indicating to master/slave device 102 that master/slave device 104 is requesting ownership of bidirectional bus 108. Upon receiving the response that includes the bus ownership request, master/slave device 102 may respond to that bus ownership request in several possible ways according to a desired, previously designated protocol.

In one set of embodiments, master/slave device 102 may operate to transfer ownership to master/slave device 104 every time it receives a bus ownership request. In another set of embodiments, master/slave device 102 may embed data in a subsequent standard bus operation request it may transmit, with the embedded data indicating whether ownership of bidirectional bus 108 has been granted or refused in response to the bus ownership request received by master/slave device 102. In yet another set of embodiments, master/slave device 102 may transmit a unique response onto data bus 108 in response to receiving the response that includes the bus ownership request, the unique response containing data indicating whether the request for bus ownership is granted or denied. Once ownership of data bus 108 has been transferred to master/slave device 104, master/slave device 104 begins operating as the master device on data bus 108. Accordingly, the functionality described above as pertaining to master/slave device 102 would now apply to master/slave device 104, and vice versa, until ownership of data bus 108 has been transferred over to master/slave device 102. For example, once master/slave device 104 has ownership of data bus 108, master/slave device 104 may initiate bus operations, to which master/slave device 102 may respond as master/slave device 104 responded when master/slave device 102 had ownership of data bus 108.

Figure 2:
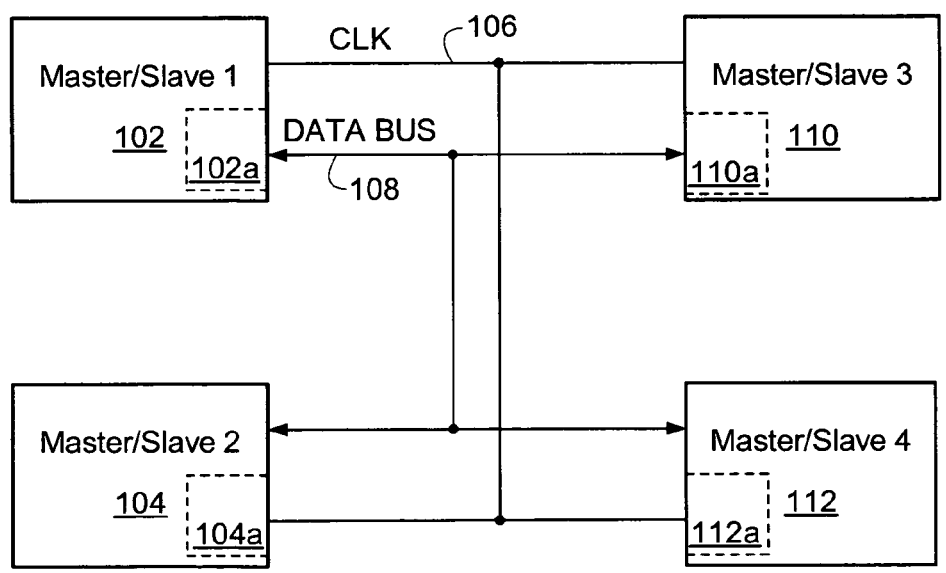
FIG. 2 shows one embodiment of a multi-master/slave system configuration.

FIG. 2 shows one embodiment of a multi-master/slave system comprising more than two master/slave devices. In the embodiment shown, a system comprises master/slave devices 102, 104, 110 and 112. Any one of these four master/slave devices may become a designated master by having ownership of data bus 108. Accordingly, master/slave devices 102, 104, 110 and 112 may operate in a manner similar to the operation of master/slave devices 102 and 104 in the embodiment of FIG. 1. For example, master/slave device 110 may have ownership of data bus 108, and may initiate bus operations such as reads and writes, targeted at any one of master/slave devices 102, 104, and 112. A targeted master/slave device, for example master/slave device 112, may respond to a request by returning data a read operation or by acknowledging a write operation. As previously described, in responding to the requests, master/slave device 112 may embed data corresponding to a bus ownership request into the response, indicating to master/slave device 110 that master/slave device 112 is requesting ownership of bidirectional bus 108. Upon receiving the response that includes the bus ownership request, master/slave device 110 may respond to that bus ownership request in several possible ways as also previously described for the embodiment of FIG. 1. Each of master/slave devices 102, 104, 110, and 112 may operate as the master device when it has ownership of data bus 108, and as a slave device when it does not have ownership of data bus 108, as described above. It should be noted that while FIG. 2 shows four master/slave devices, alternate embodiments may only contain two or three master/slave devices (for example as shown in FIG. 1), or more than four master/slave devices all coupled to data bus 108 and configured to operate according to the principles described above.

In one set of embodiments, data bus 108 may be a single-wire bus, and bus transactions may be packetized. Preferred embodiments of possible packet structures are discussed below. Packets may be structured according to a variety of different bus protocols. For the purposes of simplicity and consistency, all packets shown below have been structured according to one exemplary bus protocol. Those skilled in the art will appreciate that embodiments other than those discussed below are possible, and may be adapted to a variety of other specified bus protocols not discussed here, according to the principles described herein. FIG. 3 shows one embodiment of a read request packet that may be transmitted by a master/slave device acting as the current master device. The packet may have a start bit 302 and an end bit 310, indicating the beginning and the end of the packet. Header field 304 may be configured to hold information indicating the type of bus operation, which in this case is a read operation in which the current master device may be requesting any one of the other master/slave devices—operating as slave devices—to respond with data from supplied address 306.

Header field 304 may also be configured to indicate if any special data is included in the packet in addition to any data that may be part of the indicated bus operation. In the example shown, header field 304 would indicate no additional data, as only data associated with a read request is included in the packet. It should be noted that the length of the header field, and any of the other fields, may be specified according to a minimum number of required bits to code for any desired number of possible operations on the bus, and for any number of categories of additional information that may be included in each packet. A tag field 305 may provide identification for the request, enabling the current master device to send out successive read requests without having to wait for a respective response to each read request prior to transmitting a subsequent read request. The packet may also include a cyclic redundancy check (CRC) code field 308 for error checking. One example of a response packet that may be transmitted by the targeted master/slave device—operating as a slave device—in response to the read request is shown in FIG. 4. The start of the response packet may be indicated by start bit 402, followed by header 403 indicating that no special data is included in the packet, and tag 405 matching the packet to its corresponding request. The requested data 404 (of the read) may be followed by CRC code 406 and end of packet bit 408. In one embodiment, the packet and data transfers occur on the rising edge of clock signal 106. One example of the timing for a read request packet and corresponding read response packet (as shown in FIGS. 3 and 4, respectively) is shown in FIG. 5.

Figure 7:
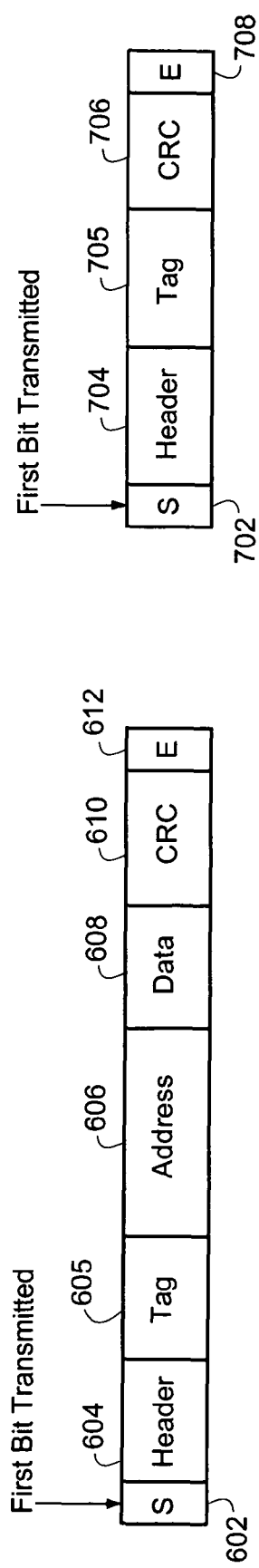
FIG. 7 shows one embodiment of a write response packet.
Figure 6:
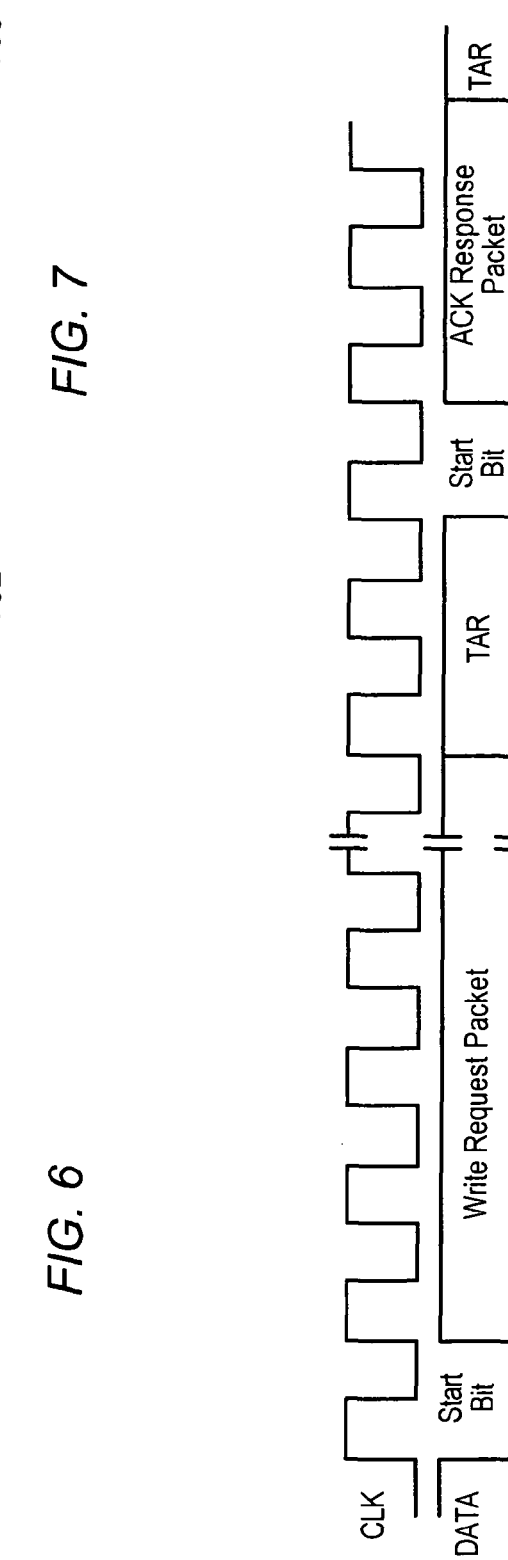
FIG. 6 shows one embodiment of a write request packet.
Figure 8:
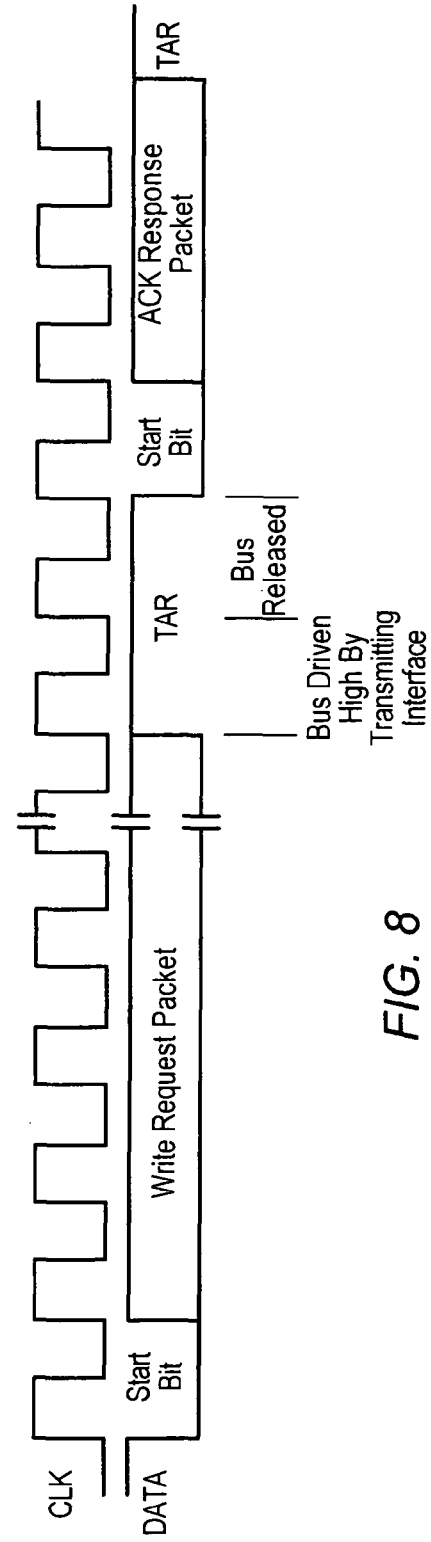
FIG. 8 shows timing for a write operation according to one embodiment.

Similarly, FIG. 6 shows one embodiment of a write request packet that may be transmitted by the current master device. For a write request, start bit 602 may be followed by header 604 indicating a write operation and that no special data is included in the packet. Tag 605 may provide identification for the request. The current master device may expect a current slave device to respond with an acknowledgement for data 608 having been written to supplied address 606. The packet may also include a CRC code 610, with end bit 612 indicating the end of the packet. One example of a response packet that may be transmitted by the current slave device in response to the write request is shown in FIG. 7. Start bit 702 may be followed by header information 704 indicating acknowledgement of the write operation, and that no special data is included in the packet, followed by tag 705 matching the packet to its corresponding request. For error checking, CRC code 706 may again precede end of packet bit 708. Again, the packet and data transfers may occur on the rising edge of clock signal 106. One example of the timing for a write request packet and corresponding write response packet (as shown in FIGS. 6 and 7, respectively) is shown in FIG. 8.

Figure 9:
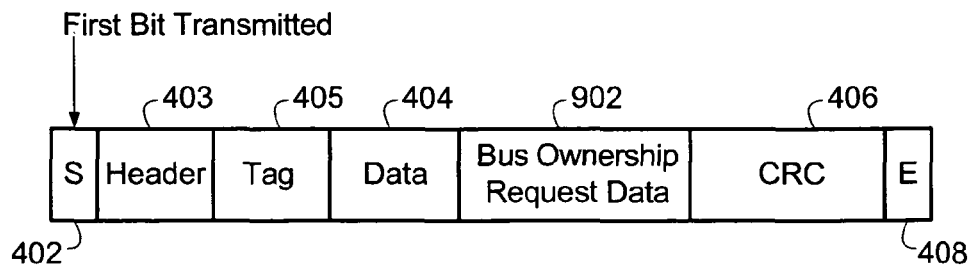
FIG. 9 shows one embodiment of a read response packet that includes bus ownership request data.
Figure 10:
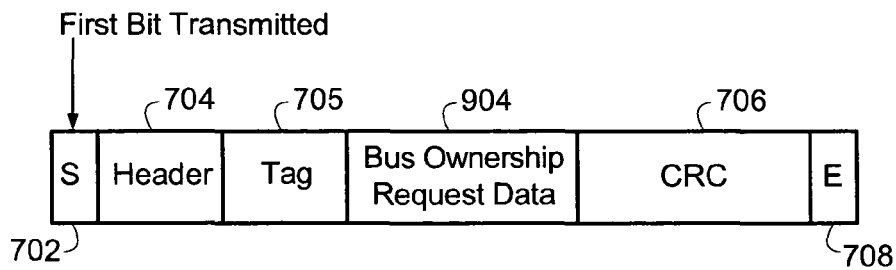
FIG. 10 shows one embodiment of a write response packet that includes bus ownership request data.

In one set of embodiments, each master/slave device (102, 104, 110, and 112 in FIG. 2) may be configured to embed bus ownership request information/data when transmitting a response packet as a slave device in response to a bus operation request received from the current master device. Thus, the read response packet shown in FIG. 4 may be reconfigured as shown in FIG. 9. In the embodiment shown in FIG. 9, header information 403 indicates that special data, in this case bus ownership request data 902, is included in the packet, inserted between read data 404 and CRC code 406. Similarly, a current slave device may also be configured to communicate bus ownership request information to a current master device when transmitting a write response packet. The write response packet shown in FIG. 7 may be reconfigured as shown in FIG. 10. In the embodiment shown in FIG. 10, in addition to indicating acknowledgment of the write operation identified by tag 705, header information 704 may indicate that special data, in this case ownership request data 904, is included in the packet, inserted between header information 704 and CRC code 706.

Figure 11:
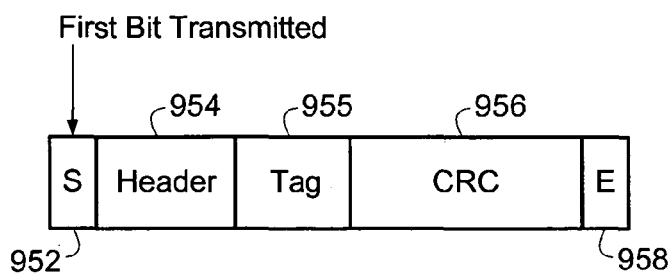
FIG. 11 shows one embodiment of a bus ownership inquiry packet issued as part of a link level protocol configured in the bus interface of a master/slave device.

In order to enable master/slave devices currently operating as slave devices to request bus ownership even when a current master device does not issue any requests, a respective bus interface configured in each of master/slave devices 102, 104, 110, and 112, shown as interfaces 102a, 104a, 110a, and 112a in FIG. 2, may be configured with a special protocol. According to the special protocol, when a master/slave device is operating as the current master device but is idle with respect to data bus 108, its respective bus interface may poll master/slave devices that are operating as current slave devices to ascertain if any of the current slave devices are requesting ownership of data bus 108. In other words, the protocol may be configured to have the bus interface of the current master device periodically issue ownership request inquiry commands to determine if there is a bus ownership request by any of the current slave devices when there is no other bus activity on bus 108. The current master device may be unaware of these ownership request inquiry commands (they may be hidden) as the current master device may be idle with respect to data bus 108. FIG. 11 shows one embodiment of an ownership request inquiry packet that may be transmitted according to the protocol, which may be a link level protocol, in bus interfaces 102a, 104a, 110a, and 112a. Start bit 952 may indicate the start of the packet, and may be followed by header information 954 indicating that this is a packet requesting ownership request information. Tag 955 may identify the request, and may be followed by CRC code 956 before end bit 958. The rate at which ownership request inquiry commands are issued when there is no other activity on bus 108 may be programmable. In one set of embodiments, the rate may be the slowest rate allowed by the system's request/grant response.

Figure 12:
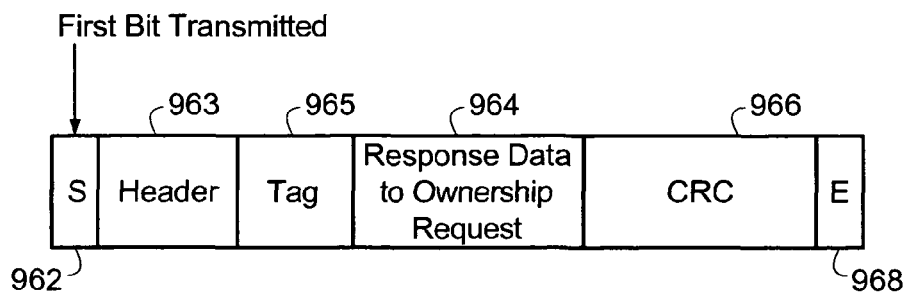
FIG. 12 shows one embodiment of a unique response packet transmitted in response to a bus ownership request.

For example, referring to the embodiment shown in FIG. 2, master/slave device 110 may be operating as the current master of bus 108, leaving master/slave devices 102, 104, and 112 operating as the current slave devices. According to the special protocol, when device 110 is idle with respect to data bus 108, bus interface 110a may send out ownership request inquiry packets, such as the packet shown in FIG. 11, to each one of devices 102, 104, and 112. In the event device 112 may wish to acquire ownership of data bus 108, for example, upon receiving the ownership request inquiry packet, device 112 may transmit a bus ownership request to device 110. Device 110 may receive the bus ownership request and, having no impending transactions, may respond to the bus ownership request by transmitting a unique packet containing data indicating whether the bus ownership request has been granted or denied. FIG. 12 shows one embodiment of such a unique packet, which comprises a start bit 962 followed by header information 963 indicating that the packet is a response to a bus ownership request. Tag 965 may identify the response packet, and may be followed by ownership request response data 964, a CRC code 966, and finally, end bit 968. If response data 964 indicates that the request had been granted, ownership of the bus may be transferred to device 112 by device 110. Subsequently, device 112 may operate as the master device on data bus 108, with device 110 now operating as a slave device along with devices 102 and 104. Accordingly, device 112, operating as the master device, may issue bus operation requests to which the current slave devices may respond, as previously described. In addition, if device 112 becomes idle with respect to data bus 108, bus interface 112a may begin transmitting ownership request inquiry packets to the slave devices in a manner similar as described above. It should be noted that when device 112 transmits a bus ownership request to device 110, the bus ownership request may comprise a packet configured as the packet shown in FIG. 11, with header 963 indicating that the packet is a bus ownership request packet, and tag 955 identifying the request, matching it to the received inquiry packet.

Figure 13:
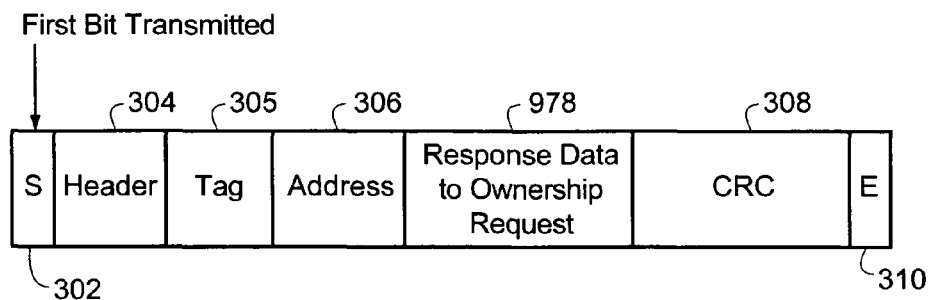
FIG. 13 shows one embodiment of a read request packet that includes response data to ownership request.
Figure 14:
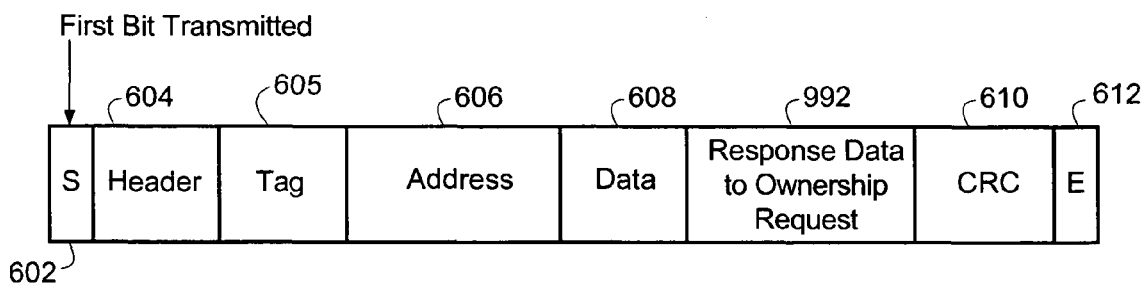
FIG. 14 shows one embodiment of a write request packet that includes response data to ownership request.

Turning again to the example of device 110 operating as the master device, device 110 may receive a bus ownership request from—for example—device 102, while device 110 is currently active with respect to data bus 108. For example, device 110 may have received the bus ownership request as part of a read response from device 102, in the form of a packet as shown in FIG. 9. If device 110 has additional pending transactions, it may respond to the bus ownership request by embedding response data in a subsequent bus operation request packet it issues, for example a read packet or a write packet. FIG. 13 shows one example of a modified read request packet configured to include response data 978 from device 110 in response to the bus ownership request of device 102. As shown in FIG. 13, the read request packet shown in FIG. 3 has been configured with response data 978 embedded between address information 306 and CRC code 308, header information 304 also indicating that special data has been included in the packet. FIG. 14 shows one example of a modified write request packet configured to include response data 992 from device 110 in response to the bus ownership request of device 102. As shown in FIG. 14, the write request packet shown in FIG. 6 has been configured with response data 992 embedded between data 608 and CRC code 610, header information 604 also indicating that special data has been included in the packet. Response data 978 and 992 may indicate whether ownership of the bus has been ceded to device 102, or retained by device 110.

For example, device 110 may only have one more bus operation pending when receiving the bus ownership request of device 102, and that bus operation is targeted at device 102. In that case device 110 may send out the last pending bus operation request packet, which, depending on type of the pending operation, may be configured as the read response packet in FIG. 13 or the write response packet in FIG. 14, with the response data, 978 or 992, respectively, indicating that the bus is granted. In one set of embodiments, device 102 may send the response to that last request (which may be identified by tag 305 or tag 605, respectively) as a slave device prior to assuming ownership of bus 108, or it may send out the response as the new master device after having acquired ownership of the bus. Similarly, if device 110 has multiple bus operations pending, the response data in the bus operation request packet transmitted by device 110 may indicate that bus ownership has not been granted. In some embodiments, the current master device may not be required to transmit a response to a bus ownership request. Instead, ownership of the bus may be granted to the requesting slave device each time the current master device receives a bus ownership request.

The master/slave system shown in FIG. 2 may also include priority/arbitration logic and/or protocol (not shown) to resolve two current slave devices requesting ownership of bus 108 simultaneously. Arbitration protocols and/or logic are well known to those skilled in the art, and while not discussed here, a variety of such arbitration schemes may be configured within the embodiments described herein. It should also be noted again that the packets illustrated in FIGS. 3, 4, 6, 7, and 9-14 are shown as examples, and many other variations and configurations of such packets are possible and are contemplated. For example, the length of each field may be dependent on the specifications or requirements of a given system, the number of desired bus operations, and/or the number of additional types of embedded data. Similarly, embedded information, such as request data 902 and response data 978 for example, may be positioned differently within a given packet from what is shown, with each packet processed accordingly.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A method for changing ownership of a bus, the method comprising:
   a first device of a plurality of devices having ownership of a serial bus and initiating a bus operation over the serial bus by transmitting a request data packet over the serial bus;
   a second device of the plurality of devices receiving the request data packet over the serial bus, and recognizing the initiated bus operation on the serial bus in response to receiving the request data packet;
   the second device transmitting a response data packet over the serial bus to the first device in response to said recognizing the initiated bus operation, wherein the response data packet comprises:
      information specifically in response to the request data packet; and
      request of ownership information indicating that the second device is requesting ownership of the serial bus;
   the first device receiving the response data packet over the serial bus; and
   the first device responding to the request of ownership information over the serial bus.

2. The method of claim 1, further comprising a bus interface, coupled to the first device, issuing a request for ownership inquiry status.

3. The method of claim 2, further comprising:
the second device receiving the request for ownership inquiry status; and
the second device transmitting an ownership request status response in response to said receiving the request for ownership inquiry status.

4. The method of claim 3, wherein the ownership request status response comprises request of ownership information indicating that the second device is requesting ownership of the serial bus.

5. The method of claim 3, wherein said issuing a request for interrupt status comprises transmitting a request packet, wherein the request packet comprises ownership inquiry data indicating that the request packet is the request for ownership inquiry status.

6. The method of claim 5, wherein said transmitting the ownership request status response comprises transmitting an ownership request status packet, wherein the ownership request status packet comprises request of ownership information indicating that the second device is requesting ownership of the serial bus.

7. The method of claim 1, wherein the request data packet is one of:
a read request packet; and
a write request packet.

8. The method of claim 1, wherein said the first device responding to the request of ownership information comprises one or more of:
the first device relinquishing ownership of the serial bus to the second device;
the first device transmitting a request for an additional bus operation, wherein the request for the additional bus operation comprises response information corresponding to the request of ownership information; or
the first device transmitting a unique response indicating whether the second device's request of ownership of the serial bus is granted or denied.

9. A system comprising:
a bidirectional serial bus;
a first device configured to initiate bus operations over the bidirectional serial bus when having ownership of the bidirectional serial bus by sending out bus operation requests over the bidirectional serial bus; and
a second device configured to receive the bus operation requests over the bidirectional serial bus, and recognize the bus operations in response to receiving the bus operation requests over the bidirectional serial bus, wherein the second device is further configured to issue a respective bus operation response over the bidirectional serial bus for one or more of the bus operations recognized by the second device, wherein the second device is configured to include in one or more of the respective bus operation responses that the second device issues:
information specifically in response to the bus operation; and
ownership request information indicating that the second device is requesting ownership of the bidirectional serial bus.

10. The system of claim 9 further comprising a clock line coupled between the first device and the second device, wherein the first device is configured to generate a clock signal and to transmit the clock signal over the clock line.

11. The system of claim 9, wherein the bidirectional serial bus is a single-wire bus.

12. The system of claim 9, further comprising a bus interface coupled between the first device and the bidirectional serial bus, wherein the bus interface comprises a protocol configured to issue one or more ownership request inquiry commands to ascertain whether the second device is requesting ownership of the bidirectional serial bus.

13. The system of claim 12, wherein the system is configured to programmatically specify a rate at which the one or more ownership request inquiry commands are issued when there is no activity on the bidirectional serial bus.

14. The system of claim 13, wherein the rate at which the one or more ownership request inquiry commands are issued when there is no activity on the bidirectional serial bus comprises a slowest rate allowed by the system's request/grant response.

15. The system of claim 9, wherein each of the bus operation requests comprises a request data packet, wherein each respective bus operation response issued by the second device comprises a response data packet, wherein the ownership request information is comprised in the response data packet when the respective bus operation response issued by the second device comprises ownership request information.

16. The system of claim 9, wherein each of the bus operation requests comprises one of:
a read request; and
a write request.

17. A system comprising:
a bidirectional serial bus; and
a plurality of devices, each of the plurality of devices coupled to the bidirectional data bus, wherein each of the plurality of devices is:
configured to initiate bus operations over the bidirectional data bus when having ownership of the bidirectional data bus;
configured to recognize the bus operations on the bidirectional data bus;
configured to issue respective bus operation responses over the bidirectional data bus for the recognized bus operations;
configured to include in the respective bus operation responses:
information specifically in response to the bus operation; and
ownership request information indicating respective requests for ownership of the bidirectional data bus; and
configured to receive the respective bus operation responses over the bidirectional data bus.

18. The system of claim 17, wherein each of the plurality of devices is configured to respond, when having ownership of the bidirectional serial bus, to the respective requests for ownership of the bidirectional serial bus.

19. The system of claim 18, wherein in responding to any one of the respective requests for ownership of the bidirectional serial bus, each of the plurality of devices is configured to perform one or more of:
relinquish ownership of the bidirectional serial bus according to the ownership request information;
transmit a request for an additional bus operation, wherein the request for the additional bus operation comprises response information corresponding to the respective request for ownership of the bidirectional serial bus; and
transmit a unique response indicating whether the respective request for ownership of the bidirectional serial bus is granted or denied.

20. The system of claim 19, further comprising a clock line coupled between each of the plurality of devices, wherein each of the plurality of devices is configured to generate a respective clock signal and transmit the respective clock signal over the clock line.

21. The system of claim 17;
wherein each of the plurality of devices comprises a respective one of a plurality of bus interfaces, each of the plurality of bus interfaces configured to operate according to a specified protocol;
wherein a device of the plurality of devices that is currently master of the bidirectional serial bus is designated as a master device;
wherein according to the specified protocol, the bus interface comprised in the master device is configured to issue one or more ownership request inquiry commands to ascertain whether any of the plurality of devices other than the master device are requesting ownership of the bidirectional serial bus.

22. The system of claim 21, wherein the bus interface comprised in the master device is configured to issue the one or more ownership request inquiry commands when the master device is idle.

23. The system of claim 21, wherein any of the plurality of devices that is not the master device is configured to receive the one or more ownership request inquiry commands.

24. The system of claim 23, wherein any one of the plurality of devices that receives at least one of the one or more ownership request inquiry commands is configured to respond to the received at least one ownership request inquiry command.

25. The system of claim 24, wherein in responding to the received at least one ownership request inquiry command, the any one of the plurality of devices is configured to transmit a bus ownership request to the master device.

26. The system of claim 25, wherein the master device is configured to receive the bus ownership request, wherein in response to receiving the bus ownership request the master device is configured to perform one of:
relinquish ownership of the bidirectional serial bus according to the bus ownership request; or
retain ownership of the bidirectional serial bus.

27. The system of claim 26, wherein the any one of the plurality of devices is configured to transmit the bus ownership request to the master device multiple times until the master device relinquishes ownership of the bidirectional serial bus.

28. The system of claim 25, wherein the bus ownership request comprises a bus ownership request packet.

29. The system of claim 21, wherein the one or more ownership request inquiry commands comprise ownership request inquiry packets.

30. The system of claim 17, wherein the bus operation requests comprise one or more of:
read requests; and
write requests.

31. The system of claim 17, wherein the bus operation requests comprise bus operation request packets.

32. The system of claim 17, wherein the plurality of devices comprises master/slave devices.

* * * * *